350-396 SR
XR 2,720,553

Oct. 11, 1955 P. M. G. TOULON 2,720,553

POLARIZED COLOR TELEVISION

Filed May 23, 1952 4 Sheets-Sheet 1

INVENTOR.
P. M. G. TOULON

BY Moore & Hall

ATTORNEYS

2720553
OR IN 358/58

Oct. 11, 1955 P. M. G. TOULON 2,720,553

POLARIZED COLOR TELEVISION

Filed May 23, 1952 4 Sheets-Sheet 2

*INVENTOR.*
P. M. G. TOULON

*BY* Moore & Hall

ATTORNEYS

INVENTOR.
P. M. G. TOULON
BY Moore & Hall
ATTORNEYS

POLARIZED COLOR TELEVISION

Filed May 23, 1952 4 Sheets-Sheet 4

INVENTOR
P.M.G. TOULON

BY Moore & Hall

ATTORNEYS

United States Patent Office 2,720,553

Patented Oct. 11, 1955

2,720,553

POLARIZED COLOR TELEVISION

Pierre Marie Gabriel Toulon, New York, N. Y., assignor, by direct and mesne assignments, of seventy-five per cent to Products and Licensing Corporation, Greenwich, Conn., a corporation of Delaware, and twenty-five per cent to Nelson Moore and William D. Hall, as joint tenants Application May 23, 1952, Serial No. 289,700

11 Claims. (Cl. 178—5.4)

Figures 1A, 1B, 1C, 1D, 1E:
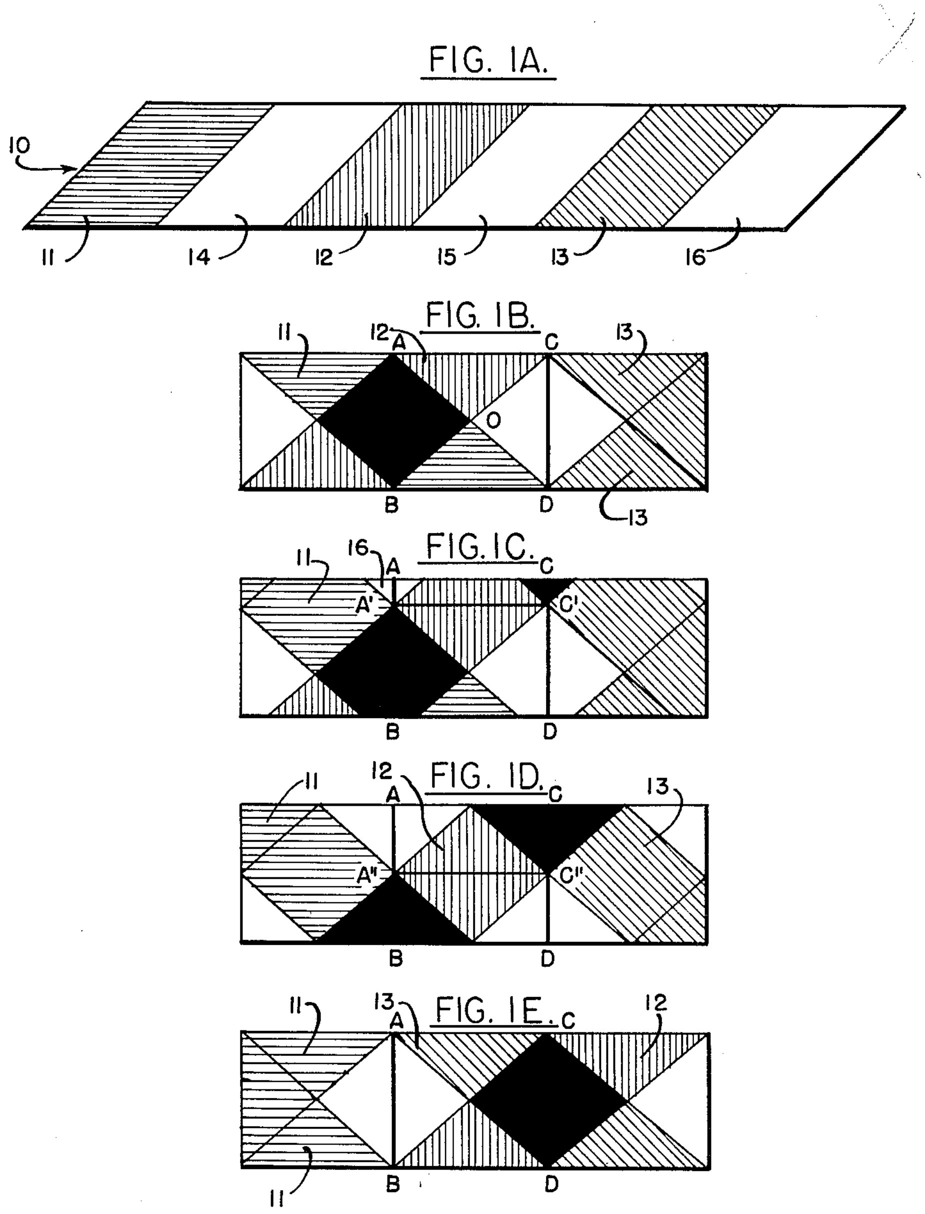

The present invention relates to a new form of color changing screen applicable to color television or three dimensional projecting installations, and is particularly concerned with color changing screens wherein color selection is obtained by selectively polarizing the light passing through a plurality of color filters.

According to the present invention, a screen upon which a picture is to appear is subdivided into a plurality of dot or vertical line elements. The various elemental areas may each have a color filter associated therewith, and the various colors are sequentially selected by successively passing differently polarized light through the screen. Thus, if the screen is divided into two groups of fine vertical lines, the even lines having vertically polarized material adjacent thereto and the odd lines having horizontally polarized material adjacent thereto, the odd and even lines may be selectively lighted by passing either vertically or horizontally polarized light through the screen. Carrying this concept one step further, if each of the odd lines also has a filter of one color associated therewith, while the even lines have a different color filter, the successive passage of the differently polarized light through the color-polarized screen will cause the screen to assume the two different colors successively.

Instead of actually using polarized light, the color screen may also have associated therewith a changing filter successively causing light of various predetermined polarizations to pass through the color screen. This changing filter may take the form of a relatively large sheet of variably polarized material moving between the color screen and a light source. The color screen again comprises a plurality of color filters, each of these filters selectively passing light of a relatively small band of polarization. Thus, the constant shifting of polarization of the light passing through the screen will again cause sequential selection of the various colors present in the color screen.

The combined action of locally polarized dots, and the use of large polarizing sheets gives the same result as that of an obturator acting simultaneously upon each dot of the picture. This alternate obturating action can be operated at any speed desired and is independent of the number of the dots, or of the accuracy of the picture. According to an embodiment of the instant invention, a plurality of obturators may be used in succession. For this purpose, according to the invention, depolarizing surfaces are provided between each group of obturators; mica sheets, or birefringent material or powder in a transparency material of the same refraction indicia are preferably used. The invention applies particularly to the trichrome additive process, and in such an application the mica sheet is covered by a mosaic of fine surfaces respectively "red," "blue," and "green" in color. One of these groups of surfaces, for instance the "red," is covered in front and back by a vertically polarized sheet. Another group, for instance the "blue," is also covered by a vertically polarized sheet in front, and is covered on the back by a horizontally polarized sheet. The third group, "green," is covered in front by a horizontally polarized sheet, and in the back, by a vertically polarized sheet.

According to the invention, to obtain only red light through the above described color screen one places an additional vertically polarized sheet in front and back of the color screen. To obtain the green, one places a vertically polarized sheet in back of the screen and a horizontally polarized sheet in front of the screen. To obtain the blue, one places an additional vertically polarized sheet in front and a horizontally polarized sheet in back of the color screen.

The present invention also relates to an embodiment of the invention using a vibrating screen for color television applications. As has been described in my copending application Serial Number 199,835, filed December 8, 1950, now abandoned, for slit screens, it is possible to change the apparent color of a screen by use of vertical parallel strips respectively colored in red, blue and green, disposed in a first sheet, and a parallel diaphragm, or cylindrical lenses, disposed on another sheet. An appropriate relative motion of the first sheet with respect to the second sheet effects alternate coincidence of the diaphragms with each successive colored strip. In order to obtain a very fine picture, the pitch of the colored strips must be very small, and there is difficulty in obtaining perfect coincidence between the diaphragm and the color filters over the entire color screen. Moreover, the displacements present in the vibrating screen must be very small and accurate in course of time. According to the present invention, however, it is possible to substitute the large amplitude displacements of a polarized sheet for the small amplitude displacement of the vibrating obturator, and no accurate coincidence is needed.

According to another embodiment of the instant invention, instead of using only vertically and horizontally polarized sheets to obtain color selection, I utilize polarizing sheets having their polarizing plane continuously changing from left to right of the picture, in the form of vertical bands.

If two sheets having the same pitch of rotation of polarization plane are placed in front of one another, and if one effects a lateral movement of the first sheet in respect to the second, each time the polarization planes are in coincidence light passes through the whole surface; each time the displacement of the sheets (¼ of the pitch) effects a 90° crossing of the polarization planes, the whole surface appears opaque. Consequently, if a first group of dots to be lighted is covered by elemental parts taken from a continuously changing polarized sheet, and a second group of dots is covered by further elemental parts taken from another sheet of the same pitch, but phase shifted by 90 degrees in respect to the plane of polarization (or phase shifted by ¼ of the pitch) it is possible, according to the instant invention, to selectively obtain the light in the first group, or in the second group, by using a moving polarized sheet, of the same pitch, having a continuously turning polarization plane. If the plane of the movable sheet is in coincidence with the first group with respect to the polarization planes, the coincidence effects transparency of the first group and, at the same time, the second group of dots is obturated. Conversely, if maximum light is obtained in the second group, because the polarization plane of the moving sheet is in coincidence with that of said second group, the first group is obturated. Consequently by giving an appropriate movement (sliding or vibration) to the movable sheet, saturated colors can be obtained locally on a television screen. The first and second groups of dots (and third group in tri-color applications) are, of course, interlaced over the entire screen surface.

It is accordingly an object of this invention to provide a new form of color changing screen effecting color discrimination by the selective polarization of light passing through the screen.

It is a further object of this invention to provide a new form of screen structure wherein various interlaced portions of the screen are selectively transmissive to differently polarized lights.

A still further purpose of this invention resides in the provision of polarized materials having a continuously changing plane of polarization and in the disclosure of an apparatus for manufacturing such materials.

Still another object of this invention lies in the provision of a color changing screen capable of operating slowly and continuously and which is readily adaptable to color television applications. It is a further object to provide such a screen wherein the required coincidence between the color filters of the screen and the selective obturators associated with the screen may be greatly reduced.

Figure 2A:
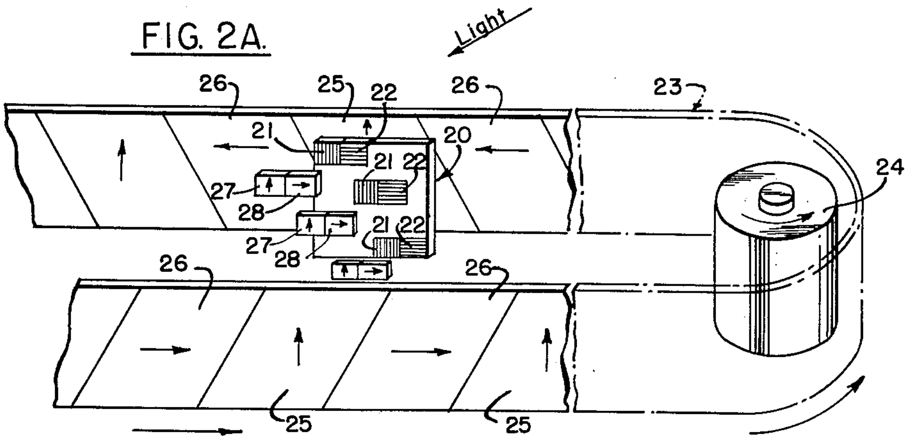
Figure 3:
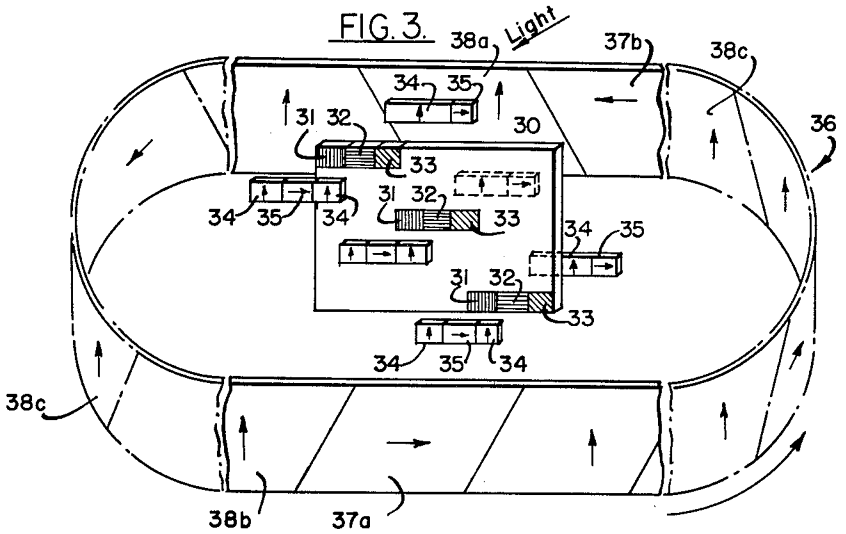
Figure 4:
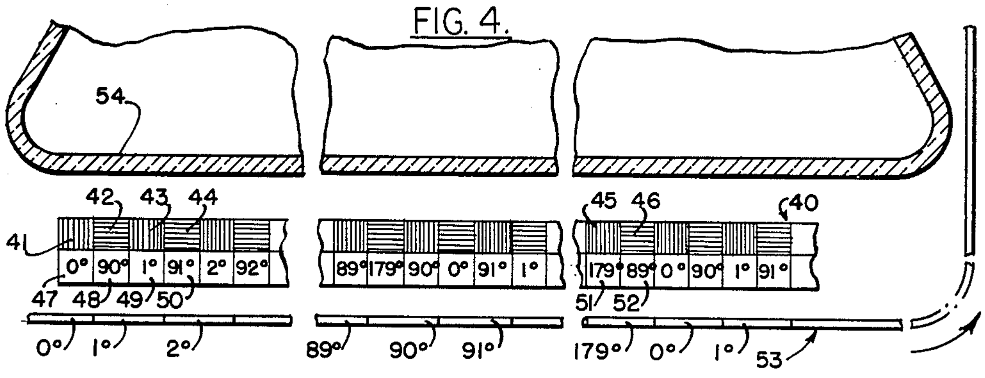
Figure 5A:
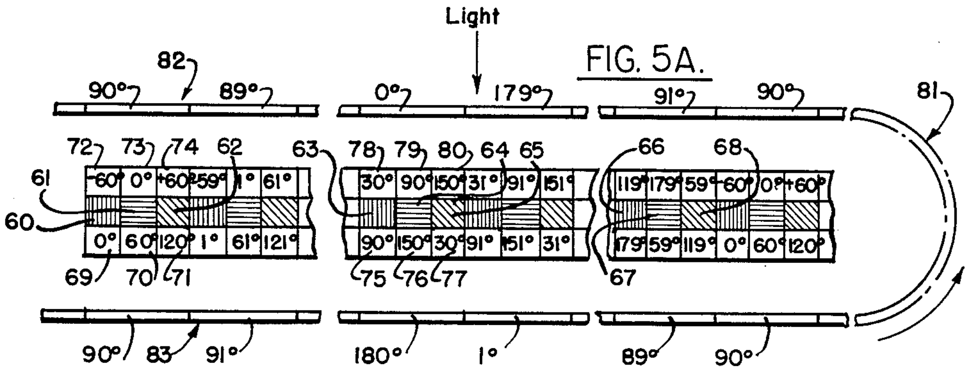
Figure 6:
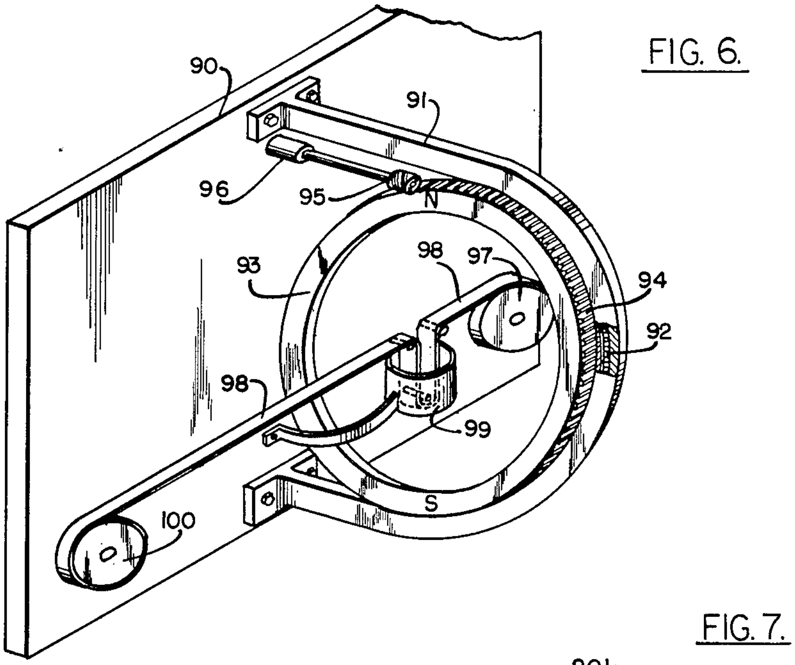
Figure 7:
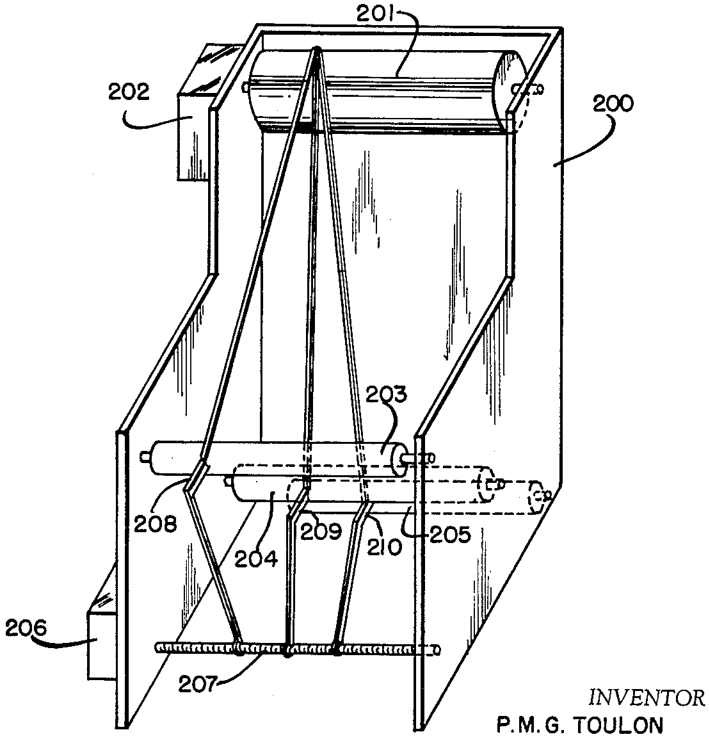

These and other objects will be readily seen from the following description and associated drawings in which:

Figures 1A–E represent the structure and operation of a sliding loop obturating member, Figures 2A and B represent a two color screen utilizing a sliding loop member having selectively polarized sections, Figure 3 represents a three color system utilizing a sliding loop member having selectively polarized sections, Figure 4 represents a two color system utilizing a constantly changing polarized loop, in accordance with the present invention, Figures 5A and B represent a three color system utilizing a constantly changing polarized loop, Figure 6 shows one form of apparatus which may be used in manufacturing a constantly changing polarized sheet for use in the present invention, and Figure 7 depicts an apparatus which may be employed in the manufacture of color screens in accordance with the present invention.

Referring now to Figures 1A–E, I have shown one form of sliding loop color change as is described in my copending application Serial No. 279,143, filed March 28, 1952, for Color Television System. The following description of that system is given as illustrative of the obturating effects of the sliding loop. It is to be understood that, while this former system utilizes color transparencies in the sliding band, the instant invention uses polarized sheets in place thereof, and the color filters themselves are disposed on a separate color screen placed within the sliding loop. However, the polarized sliding band, which is used in the instant invention, effects a downward sweep of a given polarization just as the system to be now described effects a downward sweep of color transparency.

Referring now to Figure 1A, a basic form of the sliding color loop comprises a transparent member 10 having transparent bands 11, 12, and 13, respectively blue, red, and green in color, disposed therein. The color bands 11, 12, and 13, are respectively separated by clear bands 14, 15, and 16, and opposite ends of the member 10 are joined to effect a loop, as illustrated in Figures 1B–1E. This loop is placed in front of a television picture tube, not shown, the picture surface of which is represented by A—B—C—D.

The loop is driven by a mechanism, not shown, synchronized with the field frequency of the television transmission, and the end effect is that of two sliding bands, moving in opposite directions in close proximity to one another, in front of the cathode ray tube face.

In the field sequential system of color television transmission, signals representative of each of the primary colors of the video intelligence are placed upon the screen successively. Thus there is, for instance, a first field of red signals, followed by a second field of green signals, followed by a third field of blue signals, after which the sequence is repeated. Each of these fields are swept onto the picture tube in the form of a raster, and the color transparencies moving in front of the screen must not only follow the proper sequence of fields as to color but must also follow the downward sweep of the raster in each of the fields. These requirements are met by the arrangement shown here.

Referring first to Figure 1B, it may be seen that the loop arrangement is such that color bands appear on both the front and back portions of the loop. In the arrangement shown, the loop is so arranged with respect to the picture face A—B—C—D that, at a first instant of time, the top of red band 12 coincides with the top A—C of the picture face. Assuming that the red band is at this instant on the front portion of the loop which is driven from left to right, in the present example, the blue band appears on the rear portion of the loop, moving from right to left, and the green portion appears on both the front and rear portions thus reversing its direction of movement. Looking to the picture face A—B—C—D at the given first instant of time, the screen presents a red portion A—O—C caused by the superposition of red band 12 and clear band 16; a clear portion C—O—D caused by the superposition of clear bands 15 and 16; a blue portion D—O—B caused by the superposition of blue band 11 and clear band 15; and a substantially black portion B—O—A caused by the superposition of red band 12 and blue band 11. At this instant of time, the television transmission is sweeping on the first line of red video information at line A—C, and a red transparency is there provided.

Looking now to Figures 1C–1E, it will be seen that, the translation of the loop portions being synchronized with the field frequency, as the red field is swept on to the picture face, the superposition of the forward and back portions of the loop provides a red transparency at each line of the raster. Thus, in Figure 1C, the line being scanned has moved downward to a position A′C′, and the left-to-right movement of the red band 12, with the corresponding right-to-left movement of clear band 16, provides a red transparency at the position A′C′. Similarly, as shown in Figure 1D, a red transparency is present at the position A″C″, when, at a later instant of time, this line is being scanned; and again, at the final sweep of the red field under discussion, a red transparency is provided at position B—D, Figure 1E. Thus, the translation of the superposed bands has caused the red color transparency to follow the downward sweep of the red field.

Similarly, assuming that the green field is next swept onto the picture face, the green transparency on the back face of the loop, Figure 1E, is now in the correct position for reception of the first line of the green raster; and translation of the green band from right-to-left causes a downward sweep of the green transparency. As may be readily seen from the foregoing discussion, the downward color sweeps will follow sequentially, being effected next by the blue band on the front surface, then by the red band on the rear surface, then by the green band on the front surface, etc.

Thus, as may be seen from the foregoing description, a sliding band or loop having slanted color bands therein may effect a sequential downward sweep of the colors present by passing light through the oppositely moving, superposed portions of the loop. Similarly, if the color bands are replaced by bands of differently polarized material, the superposition of oppositely sliding bands of such material will effect a downward sweep of a given polarization. In this respect, however, it must be noted that two oppositely polarized sheets, when superposed, will not effect the same opacity without regard to the faces of the sheets placed adjacent one another. Thus, let us assume that we are given a vertically polarized sheet and a horizontally polarized sheet, and that we then superpose the two sheets with the planes of polarization at right angles to one another and with first faces of each of the sheets adjacent one another, and that we then observe the amount of light passing through the combined sheets. If one of these sheets should then be reversed and the other face of this sheet then superposed on the first face of the first sheet, again with the planes of polarization at right angles to one another, it will be found that a substantially different amount of light passes through the sheets. Thus if, for instance, a first face of the first sheet and a first face of the second sheet are contiguous, the combined sheets will be substantially opaque. However, if the said first face of the first sheet is contiguous with the second, opposite face of the second sheet, the combined sheets, rather than being opaque, will pass a substantial amount of light. This effect is utilized in the instant invention, as is shown for instance in the embodiment of Figure 3, to effect selective passage of light through the color screen by the superposition, in the sliding band and color screen of polarized sections of both the same and different planes of polarization.

Referring now to Figures 2A and B, we see one basic form of the instant invention in which a specially constructed color screen may sequentially present a downward sweep of two different colors through the use of a moving loop of polarized material. The screen 20 may be placed in front of the picture face of a television cathode ray tube, not shown, and comprises a plurality of red and blue transparencies 21 and 22. These transparencies (which are greatly enlarged in the drawing) may take the form of a plurality of narrow vertically disposed filters alternating with one another, or they may be associated with dot elements of the picture and interlaced over the entire screen surface. Each of the red filters 21 is covered by a complementary vertically polarized clear transparency 27, while each of the blue filters has a horizontally polarized clear transparency 28 covering it. Inasmuch as the filters are extremely small and are distributed over the entire surface, it will be readily seen, therefore, that if vertically polarized light is passed through the screen, the screen will appear to be red in color, while the passage of horizontally polarized light will effect a blue color.

Figure 2B:
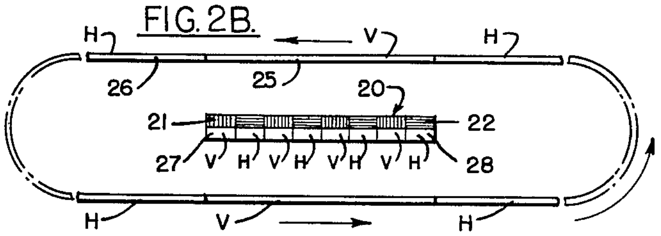

The selective polarization of light through screen 20 is effected by a loop 23 driven by a mechanism 24 so that the oppositely traveling portions of the loop move past opposite sides of the screen 20. As will be readily seen, the oppositely moving portions of the loop may be superposed on the same side of the color screen, in the instant embodiment of the invention, or only one portion of the loop need be used, the return portion of the loop being disposed to the rear of the picture tube. The loop 23 comprises a plurality of vertically polarized clear sections 25 and a plurality of horizontally polarized clear sections 26 placed contiguous with one another and alternating along the length of the loop. As may be seen from the top schematic view of the system, Figure 2B, when two vertically polarized sections 25 of the loop are on opposite sides of screen 20, any light passing through the sliding loop and color screen will make the screen appear to be red. As the loop moves under the impetus of drive 24, two horizontally polarized sections 26 will next be superposed on opposite sides of screen 20, and the screen will appear to be blue. Still further movement will change the color back to red, etc. Moreover, because of the shape of the polarized sections 25–26, the color sweeps will be sequentially downward, as has been described with reference to Figures 1A–E. Thus the system of Figure 2 may be utilized in any two color system.

In practice, it is preferable to provide a system wherein three colors may be caused to successively appear on a color screen. Such a system is shown in Figure 3. This embodiment of my invention utilizes a color screen 30 having a plurality of red filters 31, blue filters 32, and green filters 33 disposed over the entire surface, as has been described with reference to Figure 2. Rather than being covered by polarized filters on only one side, the color filters of Figure 3 have polarized filters on each side thereof. Thus each red filter 31 has a vertical filter 34 on the front surface thereof, and a further vertical filter 34 on the rear surface thereof. Each blue filter has a horizontal filter 35 on the front surface and a vertical filter 34 on the rear surface, and each green filter has a vertical filter 34 covering the front surface and a horizontal filter 35 covering the rear surface.

The traveling loop 36 is much the same as loop 23, except that the polarized bands are disposed along the length thereof in a cyclic configuration of vertical-vertical-horizontal, rather than being alternately vertical and horizontal. Assuming that the source of light, for instance the television picture tube, is at the rear of the sliding loop-color screen configuration, and referring to the loop position shown in Figure 3, light passing through the rear vertically polarized band **38*a* will be blocked by rear horizontal filter 35; the light will pass through rear vertical filter 34, however, and through color filters 31 and 32. Front horizontal filter 35 is so arranged with respect to rear filter 34 that it will permit a substantial amount of light to pass therethrough. This is effected by the proper disposition of the relative faces of front filter 35 and rear filter 34 with respect to one another. Thus light passing through rear vertical filter 38*a* will be permitted to pass completely through both the red filters 31 and the blue filters 32. The front horizontal sliding filter 37*a* will block the vertically polarized light coming from front filter 34, associated with the red filters 31, so that light passing through the blue filters 32 will be the only light permitted to pass through the entire sliding loop-color screen configuration. Thus, for the loop position shown in Figure 3, the screen 30 as viewed through the loop 36** will appear to be blue.

As the loop continues its movement, the sections **37*b* and 38*b* will then be superposed on opposite sides of screen 30. Light passing through horizontal section 37*b* will be blocked by rear vertical filter 34 and will therefore pass only through rear horizontal filters 35 and green filters 33. Front vertical filters 34 are again so disposed with respect to rear horizontal filters 35 that a substantial amount of light may pass therethrough. This light is in turn transmitted through front loop section 38*b* so that, for this next position of the sliding loop 30**, the screen will appear to be green.

As the loop moves still further, a vertical section **38*c* will be at the rear of the configuration. As has been described with reference to the first loop position, shown in Figure 3, this permits light to pass completely through both the red and blue filters, but not through the green. In this third position of the loop, however, the front loop portion is a vertically polarized section 38*c*. This section 38*c* will thus block the horizontally polarized light coming from front horizontal filter 34**, associated with the blue transparency, and the screen will appear to be red. Thus, the sliding band and color screen of Figure 3 causes successive sweeps of red, blue, and green color to appear before the face of the picture tube.

It must be noted that the same considerations discussed above with respect to having the proper faces of the polarized sheets facing one another must also be taken into account in the construction of the moving loop. Thus, referring to the loop position shown in Figure 3, the surfaces **38*a* and 37*a*, which are respectively vertically and horizontally polarized, should also be so arranged that, when superposed, they permit light to pass therethrough. If the polarizing materials used produced planar polarization, a diffusing surface should be included in the plane of the color filters 31, 32, 33 in order to permit light which passes through the rear polarizing filters 34, 35 to also pass through the front polarizing filters 34, 35, 34**. However, this diffusing surface is not necessary if, as is the case in the embodiments of the invention described herein, polarizing materials effecting circular polarization are used.

It should further be noted that, although the color screens 20, 30, already described, and those to be described with reference to Figures 4 and 5, appear to be rather complex, these screens may be readily manufactured by the apparatus of Figure 7. Further, notwithstanding the high degree of accuracy required in the construction of these screens, this accuracy can readily be obtained and extremely accurate color registration may be effected since the color screen itself has no moving parts and, once constructed, presents a stable accurate configuration.

The embodiments of Figures 2 and 3, while producing the required color changing effect, do have the disadvantage of requiring considerable accuracy of coincidence between the polarized bands of the moving loop and the stationary color screen. This required coincidence is greatly lessened by the embodiments of the invention shown in Figures 4 and 5.

Referring first to Figure 4, which is a top view of the color screen and moving loop for simplicity of description, a two color system has been shown. The color screen 40 comprises a plurality of red and blue filters 41–42, 43–44 . . . 45–46, preferably arranged in alternating vertical rows across the screen surface. It is to be understood, of course, that the colors "red" and "blue" used in describing the two color systems of this invention are not meant to be limitative of my concept. Any color filters may be used, and the colors should preferably be the components of white light, in the proper proportion. The color filters 41–42 . . . 45–46 are again each covered by a thin sheet of polarizing material. However, rather than using merely vertically and horizontally polarized materials, as has been the case in the previously described embodiments, the covering sheets of polarizing material are selected to have a plurality of angles of polarization. Further, the color filters are so covered by these materials, that the plane of polarization of successive color filters is constantly changing.

Thus, the first red filter 41 is covered by polarizing material 47 having a plane of polarization of 0° while the adjacent blue filter 42 is covered by polarizing material having a plane of 90°. There is thus a 90° difference in the planes of polarization of adjacent red and blue filters in each group, and this difference in angle is kept constant for each of the plurality of color filter groups. The angle of polarization of each filter differs from that of the corresponding filter in adjacent groups, however, and this changing angle of polarization follows a cyclic pattern. Thus the red filter 41 is covered by material 47 at an angle of 0°; the next red filter 49 is covered by material 50 at an angle of 1°; the next red filter has an angle of 2°, the next an angle of 3°, et cetera, until, at the red filter 51, the covering material has an angle of 179°. Thus, the series of red filters 47–51 are covered by material which has effected a successive shifting of the plane of polarization through 180°. As may be seen from Figure 4, a similar state of affairs has occurred with respect to the blue filters, with successive blue filters 48–52 changing from a plane of polarization of 90° through an angle of 179°, to 0°, and again to 90°. The angular changes between adjacent filters need not be made in 1° steps, of course, and any other convenient interval, for instance 10° steps, may be used. I term the number of filters utilized in changing the plane of polarization through 180° as the "pitch" of the color screen. The above described "pitch" is repeated across the screen surface a plurality of times.

The moving loop 53, rather than using adjacent bands of horizontally and vertically polarizing material, has a constantly changing plane of polarization. Thus, the angle of polarization of adjacent portions of the loop 53 changes from 0° to 180°, and the "pitch" of this change in loop polarizing angle is the same as that of the color screen 40. Each step of angular change in the loop 53 covers a distance corresponding to two of the color filters

41–52. Thus, the loop section at 0° covers the color filters at 0° and 90°, while the 1° section of the loop covers the color filters at 1° and 91°, etc. In the embodiment of Figure 4, only one portion of the loop 53 is used, the return portion being disposed, for instance, to the rear of the television picture tube 54. The return portion of the loop 53 may be placed between the picture tube 54 and color screen 40 if a diffusing surface is also placed between the return portion of the loop 53 and the color screen 40. Again, materials effecting circular polarization may be used.

Referring to the embodiment of Figure 4 wherein only one portion of the loop is shown, it will be readily seen that, for the loop position shown in Figure 4, light coming from the tube 54 will pass through each of the red and blue filters and will be polarized successively at different angles. The screen, for this position of the loop, will appear to be red in color inasmuch as the angle of polarization of the loop sections is the same as that of the red filters, while the loop sections are, however, at 90° to each of the corresponding blue sections. After the moving loop has moved through a linear displacement of ½ the "pitch" (or a 90° change) the loop polarizing sections will respectively be in phase with the blue filters, but will be at 90° to each of the red filters. Thus, after this linear displacement the screen will appear to be blue. Thus, as the loop 53 is translated, the color of the screen 40 will appear to change alternately between red and blue. The loop 53 may be made up of distinct sections progressively at different angles of polarization, or it may be constructed of a constantly changing polarized sheet, in accordance with Figure 6 of this invention. It should further be understood that the various loop sections are at a physical angle to the direction of the various color filters, so that the colors appear to be successively swept onto the color screen. This structural concept has been set out in the description of Figure 1 and is more fully developed in my copending applications Serial No. 199,835 and Serial No. 279,143, cited previously.

Figure 5B:
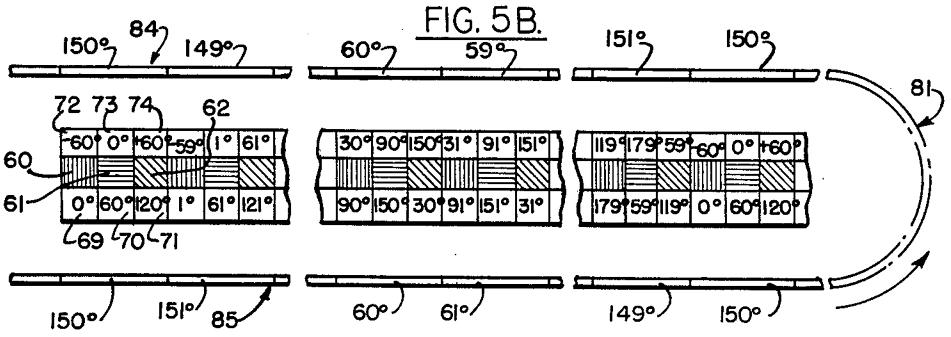

Referring now to Figures 5A and 5B, I have shown a development of the concept discussed in reference to Figure 4, whereby the color screen and moving loop having a constantly changing plane of polarization may be utilized in three color applications. Again, as in Figure 3, the three color screen comprises a plurality of red, blue, and green color filters 60—61—62, 63—64—65, 66—67—68, covered on both their front and back surfaces by circularly polarizing sections 69—70—71, 72—73—74, etc. The color filters are again grouped, as in Figure 4, and there is a constant changing of the plane of polarization of corresponding color filters in adjacent groups throughout the "pitch" of the color screen. Referring to the first group of filters 60—61—62, it will be seen that these color filters are covered on their front surface by polarizing materials at 0°, 60°, and 120°, respectively, and on their rear surfaces by polarizing materials at —60°, 0°, and +60°, respectively. Thus, there is a 60° difference in phase between adjacent filters on each of the surfaces, and a further 60° difference between filters on the front and back of each color filter. This phase relation is kept constant within each group of filters throughout the color screen surface, but, as in Figure 4, the actual angle of each filter progressively changes from group to group throughout the screen "pitch." Thus, at color filters 63—64—65, the actual angles have shifted through 90°, and at color filters 66—67—68, the end of the "pitch," the shift has been substantially 180°.

The moving loop 81 again comprises, as in Figure 4, a plurality of polarizing sections progressively changing in angle of polarization from 0° to 180°, the pitch of the loop 81 again being the same as that of the color screen. The sections of loop 81 change in steps corresponding to the step changes between adjacent groups of the color screen, and again each section of the loop 81 covers a distance corresponding to one group of filters.

Referring to the first color group 60—61—62 of Figure 5A, it will be seen that, for the particular loop position shown, loop sections at 90° are found on each side of the color group. Assuming that light comes from the rear of the installation, this light will pass through section 82 and will assume an angle of 90° therein. This light will be completely blocked by material 73, which is at an angle of 0°, so that no light passes through the blue filter. Considerable light passes through each of sections 72 and 74, however, since these are at —60° and +60° respectively. In passing through filter sections 72 and 74 the light will be circularly polarized, will then pass through the red and green filters 60 and 62, and then through filter sections 69 and 71 whence the light emanates at angles of 0° and 120° respectively. The light coming from filter 69, at 0°, is completely blocked by the front section 83 of the loop, which section is at 90°. The light from filter 71, at 120°, will pass through loop section 83, however, and this position of the loop therefore makes the screen appear to be green in color. The foregoing discussion of course applies to each of the color groups in Figure 5A since the phase differences between filters of the various groups and the loop sections are the same throughout the groups. Thus, the entire screen appears green in this loop position.

Figure 5B represents the situation after the loop 81 has been translated through ⅓ of the "pitch" (or 60°). In this position of the loop, the first color group 60—61—62 is covered on each side by loop sections 84 and 85, which are each at 150°. Light passing through section 84 is given a phase angle of 150°. This light is completely blocked by filter 74 which is at +60° (a phase difference of 90°) but passes in great part through filters 72 and 73 wherein it is circularly polarized. The circularly polarized light then passes through red and blue filters 60 and 61, and through front polarizing filters 69 and 70 whence it emanates at angles of 0° and 60° respectively. The 60° light from blue filter 61 is again completely blocked by front loop section 85 which is at 150° (again a 90° difference), while the 0° light from red filter 60 passes through section 85. Again the same situation applies in each of the other color groups and, for this second position of the loop, the screen appears to be red in color.

As may be seen from the foregoing discussion, a similar situation applies after a still further 60° translation of loop 81, and for this latter position the screen will appear to be blue. Thus, as the loop continues to move, the three colors of the system employed will be successively swept onto the color screen.

Figure 6 shows a simplified form of apparatus utilized in the manufacture of a constantly changing polarized sheet, in accordance with the embodiment of Figures 4 and 5 of the instant invention. It should be noted that polarizing sheets are ordinarily prepared by placing a transparent base material in a bath of material such as sulfate of iodoquine, capable of assuming a light polarizing configuration, and subjecting the coated base to an electromagnetic field during the drying or setting of the coating. Recognizing this basic concept, the apparatus of Figure 6 passes the base material through the required bath, and subjects the coated base to a constantly rotating electromagnetic field during the drying or setting of the coating. By adjusting the relation between the speed of rotation of the magnetic field and the speed of the base material through the coating bath, any desired "pitch" of the resulting polarizing loop may be obtained.

The apparatus of Figure 6 comprises a supporting member 90 having a semi-circular structural member 91 fastened at right angles thereto. Supported within member 91 by bearing 92 is a circular magnet 93 having a gear edge 94 around the periphery thereof. Coupled to gear 94 is a further gear 95 driven by a variable speed motor 96. Magnet 93 may take the form of a permanent magnet or may be an electromagnet fed through slip rings.

A supply roll 97 feeds a strip of transparent base material 98 through a bath 99 supported within the center of ring magnet 93, and the coated material is fed to a take-up roll 100 driven by a variable speed motor, not shown. The strip material is fed into and taken out of bath 99 at right angles to the surface of the bath, so that the coated strip is in the same plane as the main flux paths of magnet 93 through the center of the magnet. Each time the magnet 93 turns through 180°, the polarization of the coated material passing through the magnet center is shifted through 180°; or through the desired "pitch." This "pitch" may therefore be varied by controlling the speed of translation of strip 98, the speed of rotation of magnet 93, or the speed of both.

Figure 7 discloses a form of apparatus which may be employed in the manufacture of a composite color screen in accordance with this invention. This apparatus comprises a supporting structure 200 having a screen forming roll 201 supported near the upper end thereof, and driven by a motor 202. Near the lower end of the apparatus are three color filter rolls 203, 204, 205 (although only two are necessary in two color applications) driven by a motor 206. The motor 206 also rotates a lead screw 207 having three cutting edges 208, 209, and 210 riding thereon, these cutting edges respectively cutting a continuous strip of filter material off of each of rolls 203, 204, and 205. The filter strips are in turn fed to roll 201 and are wound along the surface thereof to form a continuous sheet of color screen material. They may be held together by a suitable adhesive, and the registration of the strips along the surface of drum 201 may be maintained in accordance with known techniques.

The color filter material placed on each of rolls 203, 204, and 205 requires special preparation in respect to the particular form of color screen desired. Thus, if the color screen of Figure 5 is to be prepared, a continuously polarizing sheet is first adhered to both faces of a blue, a red, and a green filter. Care must be taken in the preparation of each of these three basic sheets to insure that there is a 60° phase shift between corresponding points on opposite sides of each sheet, and that the starting points (for stripping of the sheet) of each sheet presents a 60° phase shift from the starting points of the other sheets. The three sheets, so prepared, are then placed around rolls 203, 204, and 205, and are sliced into strips as described above. It should be noted that inasmuch as the basic sheets are each prepared separately from the final color screen, and inasmuch as the polarizing filter materials are adhered to the color filter before the screen build-up is started, great accuracy can be effected in the disposition of polarizing and color elements in the final screen. Moreover, this accuracy being permanently built into the color screen, the subsequent color registration is independent of the wear or movement of parts.

It should further be noted that the translational speed of the moving loop may be greatly reduced by using, with the system of the instant invention, an optical system such as is described in my copending application Serial No. 267,821, filed January 23, 1952, for Optical System. The use of such an optical system in moving loop color changers has been described in my copending application Serial No. 279,143, cited previously.

Although the previous description has been concerned with a color screen for television purposes, this is not meant to be limitative of my invention. The screen of the instant invention may also be used in advertising installations, in three dimensional projecting systems, and in various other systems wherein it is desired to present a series of informations sequentially to the eye of an observer. In this respect, the various filters described as red, blue, and green color filters may, in proper circumstances, be replaced by other forms of transparency information. Thus, a first set of "indicia" may replace the "red" filter, a second set of "indicia" replace the "blue" filter, and a third set the "green" filter. Two sets of indicia may, of course, replace the color filters of my "two-color" system. The movement of the loop as has been described, will serve to place these sets of indicia on the screen sequentially. The "indicia" referred to may take the form of the component parts of three separate pictures, and these three pictures would then cyclically appear on the screen, or on a projection surface, as the moving belt is actuated.

Having thus described my invention, I claim to have invented:

1. In a color television system, a plurality of small transparencies interspersed with one another and distributed over a relatively large surface to form a screen, each of said transparencies being associated with a predetermined relatively small number of dot elements of a television picture; a plurality of small polarizing filters respectively associated with each of said small transparencies and; covering said transparencies, said transparencies being of at least two different colors, said polarizing filters including first polarizing means covering only transparencies of a first color and permitting light of only a first range of polarization to pass therethrough and second polarizing means covering only transparencies of a second color and permitting light of only a second range of polarization to pass therethrough, said first range of polarization being exclusive of said second range of polarization, a movable loop of polarizing material, said loop including alternate sections of differently light polarizing filters, means causing a face of said loop to be translated past said screen, and a light source directing light through both the face of said loop and said screen.

2. The system of claim 1 wherein said light source is the picture face of a cathode ray tube.

3. In a color television system, a color changing screen comprising a plurality of at least three differently colored light filters contiguous with one another and distributed in interspersed relation to effect a screen surface, first polarizing filters having a first plane of polarization and covering each of the filters of a first and second color on a first face of the screen surface, and covering each of the filters of a first and third color on the opposite face of said screen surface, second polarizing filters having a second plane of polarization and covering each of the filters of the said third color on the said first face of the screen surface, and covering each of the filters of the said second color on the said opposite face of the screen surface, and means causing light of successively different planes of polarization to be directed at said screen.

4. The system of claim 3 in which said differently colored light filters are in the form of elongated narrow filters contiguous with one another adjacent their elongated edges, the said color light filters being cyclically distributed as to color.

5. The system of claim 4 in which the plane of polarization of the light polarizing filters is varied from color filter to color filter, said variation in plane of polarization being in predetermined increments.

6. The system of claim 5 in which said means causing light of successively different planes of polarization to be directed at said screen includes a transparency of polarizing material movable past said screen, said transparency of polarizing material having a constantly changing plane of polarization.

7. In a color television system, a color changing screen comprising a large number of small transparencies interspersed in contiguous relation over a relatively large surface to form a screen, said transparencies being of at least two different colors and each transparency being associated respectively with a relatively small number of dot elements of a television picture, a first plurality of light filters having a first plane of polarization and covering each of said transparencies of a first color, a second plurality of light filters having a second plane of polarization and covering each of said transparencies of a second color, a movable loop of polarizing material surrounding said screen, said loop having relatively large, oblique sections of differently light polarizing filters disposed alternately along the length thereof, and means causing the faces of said loop to be translated in opposite directions past opposite faces of said screen.

8. The system of claim 7 wherein said transparencies are arranged in groups of three different colors, said first and second pluralities of light filters covering each of said groups on both faces of said screen, the transparencies of at least one of said colors having a light filter of the first plane of polarization covering one surface thereof and a light filter of the second plane of polarization covering the opposite side thereof.

9. A color television system comprising a cathode ray picture tube, a color changing screen adjacent the face of said picture tube, said screen comprising a plurality of small transparencies disposed in contiguous relation over a relatively large surface, said transparencies being of three different colors interspersed with one another, and a plurality of light filters of at least two different planes of polarization affixed to each of the faces of said screen and respectively covering both faces of each of said transparencies, transparencies of at least one of said colors having filters of a first plane of polarization attached to one side thereof and having filters of a second plane of polarization attached to the opposite side thereof.

10. The system of claim 9 including a loop of variable light polarizing material surrounding said screen, one face of said loop being interposed between said screen and said picture tube and a second face of said loop being interposed between said screen and an observer, and means causing the said faces of said loop to be translated in opposite directions past said screen.

11. The system of claim 10 in which said loop comprises a plurality of oblique transparencies, of two different planes of polarization, disposed in alternate relation along the length thereof, each of said transparencies having substantially the same width and height as that of said screen.

References Cited in the file of this patent

UNITED STATES PATENTS

| | | |
|---|---|---|
| 2,259,884 | Goldsmith | Oct. 21, 1941 |
| 2,274,039 | Cawley | Feb. 24, 1942 |
| 2,473,857 | Burchell | June 21, 1949 |
| 2,586,635 | Fernsler | Feb. 19, 1952 |